(12) United States Patent
Gundappa et al.

(10) Patent No.: US 11,640,623 B2
(45) Date of Patent: May 2, 2023

(54) OPTIMIZING UTILIZATION AND MARKETING OF CAR WASHES

(71) Applicant: Wayne Fueling Systems LLC, Austin, TX (US)

(72) Inventors: Sangamesh Gundappa, Karnataka (IN); Anand Krishna, Karnataka (IN); Raghav Verma, Karnataka (IN); Shubhankar Sundriyal, Karnataka (IN); Om Prakash Gupta, Karnataka (IN); Hob Hairston, Cedar Park, TX (US); Henry Fieglein, Leander, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 169 days.

(21) Appl. No.: 17/022,495

(22) Filed: Sep. 16, 2020

(65) Prior Publication Data

US 2021/0081992 A1    Mar. 18, 2021

Related U.S. Application Data

(60) Provisional application No. 62/902,028, filed on Sep. 18, 2019.

(51) Int. Cl.
*G06Q 30/00* (2012.01)
*G06Q 30/0251* (2023.01)
(Continued)

(52) U.S. Cl.
CPC ..... *G06Q 30/0257* (2013.01); *G06Q 10/1095* (2013.01); *G06Q 30/0252* (2013.01);
(Continued)

(58) Field of Classification Search
CPC ....... G06T 7/70; G06Q 10/1095; H04L 67/18; H04L 67/42; H04L 67/10
See application file for complete search history.

(56) References Cited

U.S. PATENT DOCUMENTS

2003/0041330 A1    2/2003  Smith
2014/0172570 A1*   6/2014  y Arcas .............. G06Q 30/0261
                                                        705/14.58
(Continued)

FOREIGN PATENT DOCUMENTS

CN    110070747 A    7/2019
KR    20160032363 A  3/2016
(Continued)

OTHER PUBLICATIONS

International Search Report and Written Opinion received for PCT Application No. PCT/US2020/050975, dated Jan. 4, 2021, 11 pages.

*Primary Examiner* — Alvin L Brown
(74) *Attorney, Agent, or Firm* — Mintz Levin Cohn Ferris Glovsky and Popeo, PC

(57) ABSTRACT

A first data packet can be received from an origination terminal at a remote server operatively coupled to the origination terminal and an end user terminal. The first data packet can have a plurality of offers and image or video data acquired by an image/video sensor. The image or video data can be processed by the remote server using an image processing algorithm to estimate a current idle time associated with the origination terminal. One or more aspects of the plurality of offers can be controlled by the remote server based on the current idle time. A second data packet including the plurality of offers can be transmitted to the end user
(Continued)

terminal by the remote server. A selection of a preferred offer of the plurality of offers can be received from the end user terminal at the remote server. The preferred offer can be provided to the origination terminal.

20 Claims, 3 Drawing Sheets

(51) Int. Cl.
*G06T 7/70* (2017.01)
*G06Q 10/1093* (2023.01)
*H04L 67/01* (2022.01)
*H04L 67/52* (2022.01)
*G06Q 30/0201* (2023.01)
*H04L 67/10* (2022.01)

(52) U.S. Cl.
CPC ........... *G06Q 30/0264* (2013.01); *G06T 7/70* (2017.01); *H04L 67/01* (2022.05); *H04L 67/52* (2022.05); *G06Q 30/0206* (2013.01); *H04L 67/10* (2013.01)

(56) References Cited

U.S. PATENT DOCUMENTS

| | | | |
|---|---|---|---|
| 2018/0096262 A1* | 4/2018 | Cho | G06Q 10/02 |
| 2018/0137594 A1* | 5/2018 | Marco | G06Q 10/063114 |
| 2019/0228461 A1* | 7/2019 | Domokos | G06Q 30/0201 |

FOREIGN PATENT DOCUMENTS

| | | |
|---|---|---|
| KR | 20170017234 A | 2/2017 |
| KR | 20170023515 A | 3/2017 |
| KR | 20170132611 A | 12/2017 |

* cited by examiner

OPTIMIZING UTILIZATION AND MARKETING OF CAR WASHES

CROSS-REFERENCE TO RELATED APPLICATIONS

This present application claims priority to U.S. Provisional Application No. 62/902,028 filed on Sep. 18, 2019, which is hereby incorporated herein by reference in its entirety.

FIELD

Methods and systems for optimizing utilization and marketing of car washes are provided.

BACKGROUND

Car wash business owners usually rely on traditional modes of marketing such as signage, flyers, posters, and social media to attract customers and command revenue/sales sufficient to sustain profitability. However, at times it can be difficult to reach potential customers via these marketing channels and to maximize revenue/sales, as marketing outreach can be limited by geographical area in which the car wash is located. It can be difficult to maximize the utilization of individual car wash units, as car wash utilization can be hampered by the seasonal nature of the car wash business in some locations.

In addition, when customers visit a car wash, they may find the individual car wash units occupied and be either forced to wait to use a car wash unit, or, even worse, to forego a car wash altogether, resulting in loss of business for the car wash. Indeed, customers are often unable to make appointments with the car wash units to alleviate this problem, and they are unable to assess and compare the prices/promotional offers of competing nearby car washes and to locate nearby car washes that have desirable features and services offered. As such, a need exists for an optimized car wash promotion and utilization system.

SUMMARY

In an aspect, a first data packet can be received from an origination terminal at a remote server operatively coupled to the origination terminal and an end user terminal. The first data packet can have a plurality of offers and image or video data acquired by an image/video sensor. The image or video data can be processed by the remote server using an image processing algorithm to estimate a current idle time associated with the origination terminal. One or more aspects of the plurality of offers can be controlled by the remote server based on the current idle time. A second data packet including the plurality of offers can be transmitted to the end user terminal by the remote server. A selection of a preferred offer of the plurality of offers can be received from the end user terminal at the remote server. The preferred offer can be provided to the origination terminal.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

In general, a car wash marketing and availability optimization system, and methods for use thereof, are provided. The system offers to create a network of smart car wash systems for publishing offers and promotions for car wash services. A variety of car wish system types can connect to a cloud platform to publish, subscribe, store, and exchange car wash offers with end user devices and interfaces. Such a platform allows for improved utilization and marketing of car wash services to end users, which can result in improved efficiency of car wash system operation.

Figure 1:
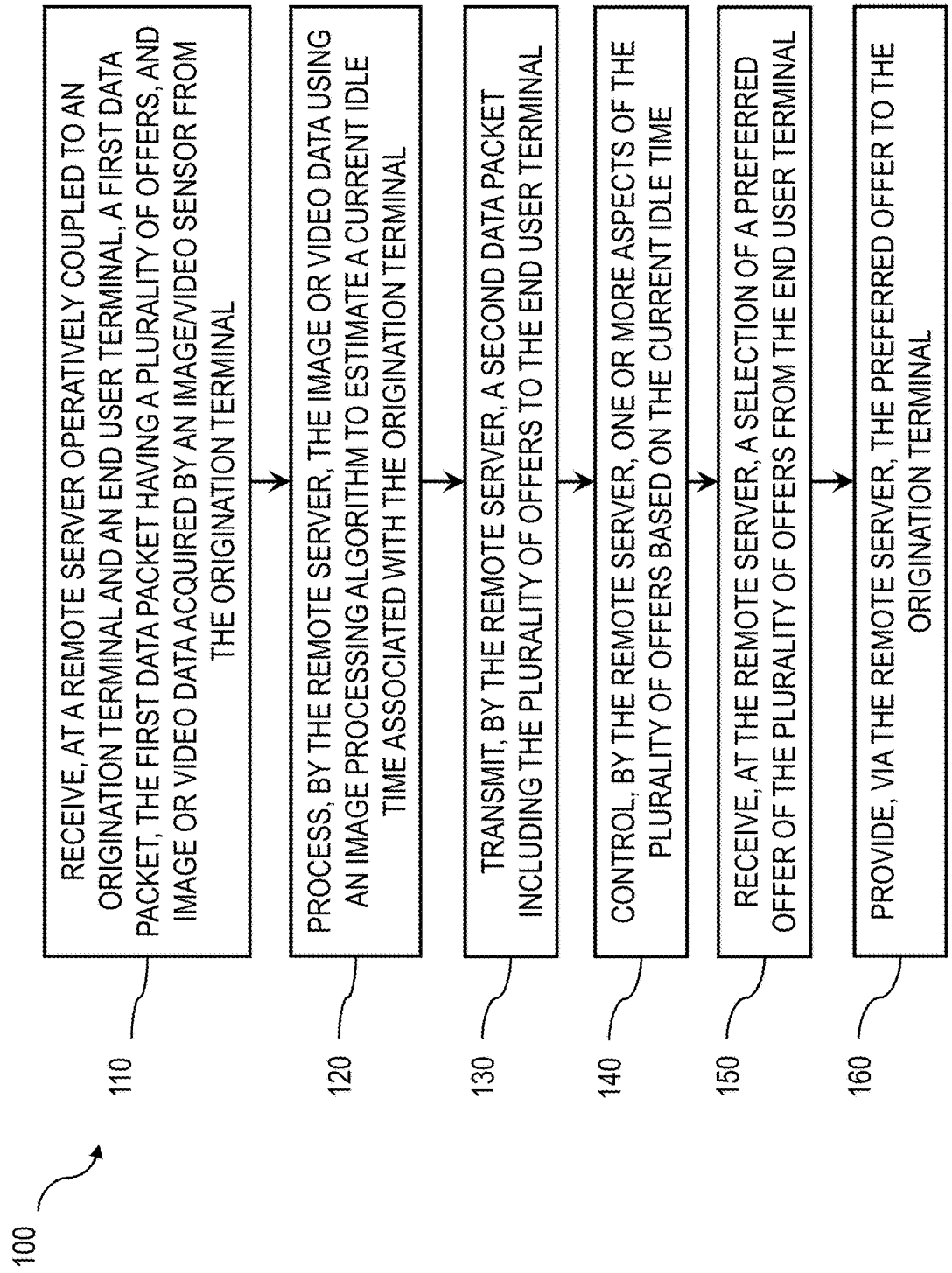
FIG. 1 is a process flow diagram illustrating an example process of some implementations of the current subject matter that can provide for optimized utilization and promotion of car wash services.

FIG. 1 is a process flow diagram illustrating an example process 100 of some implementations of the current subject matter that can provide for optimized utilization and promotion of car wash services.

At 110, a first data packet can be received, from an origination terminal of a car wash, at a remote server operatively coupled to the origination terminal and an end user terminal. The first data packet can include a plurality of offers and image or video data acquired by an image/video sensor from the origination terminal. The plurality of offers, in some implementations, can include at least one price for at least one car wash service. The at least one car wash service can include, for example, one or more of the following automobile treatments (e.g., shampooing and rinsing exterior windows and bodywork of a car, sealing/waxing the exterior bodywork, rinsing an undercarriage of a car, etc.). However, other automobile treatments known to persons of skill in the art may be included. Additional values may also be included in the plurality of offers, such as, by way of non-limiting example, prices for retail products, vehicle spare parts, etc. The remote server can be configured to receive the first data packet from the origination terminal and, as explained in further detail below, to transmit some or all of the content of the first data packet to the end user terminal.

In some implementations, the origination terminal can also comprise a computerized car wash pricing system that is configured to generate the at least one price for inclusion in the first data packet. The at least one price can be generated using a first algorithm. The algorithm can be configured to generate the at least one price based on several parameters, including, by way of non-limiting example, vehicle condition, vehicle driving history, car wash history, geographical terrain, weather conditions, and geolocation. In some implementations, the parameters can comprise values sourced from the remote server that are, for example, indicative of weather data from internet-based service providers, traffic data from internet-based service providers, vehicle data from internet-connected automobiles, and geolocation data from internet-based service providers. In some implementations, the parameters can also comprise values corresponding to image and/or video data acquired by the image/video sensor. Each of the parameters can be assigned a first weight value. The first weight value can be automatically determined based on a default configuration stored in a memory of the origination terminal, or based on preferences established by a user interface on the origination terminal and stored in the memory of the origination terminal. In some implementations, the first weight value can be manually set by the user via the remote server. In some implementations, the first weight value may be based on the geolocation of the car wash. The first weight value for each parameter can be applied to each parameter value to generate a weighted parameter value for each parameter. Each weighted parameter value can be used to generate a discount value, which can be a quantified measure of how much to reduce a default price for the at least one car wash service. The default price can be established via the user interface on the origination terminal and stored in the memory of the origination terminal. The discount value, the default price can be used in conjunction with a car wash service weight value to derive the at least one price for the at least one car wash service.

The origination terminal, in some implementations, can comprise a computerized car wash availability management system that is configured to monitor the availability and utilization of individual car wash bays at a car wash and to generate the at least one car wash service for inclusion in the first data packet. In some implementations, the car wash availability management system can include a sensor configured to monitor whether an individual car wash bay is occupied by a user. The sensor can be configured to output a signal that indicates whether an individual car wash bay is occupied by a user. The car wash availability management system can be configured, in some implementations, to determine an idle time, during which the individual car wash bay is unoccupied by a user, based on outputs from the sensor. The car wash availability management system can, in some implementations, generate the at least one car wash service for inclusion in the first data packet based on the idle time.

In other implementations, the idle time can be generated using a second algorithm. The algorithm can be configured to generate the idle time based on current and historical individual car wash bay usage data that is indicative of usage patterns. In some implementations, the algorithm can be configured to generate the idle time based on future availability of the individual car wash bay, a number of cars waiting to use the individual car wash bay, occupancy of the individual car wash bay, and the date/time at which the algorithm is generating the idle time.

The plurality of offers can, in some implementations, be determined in response to at least one preferred value for at least one of the following parameters: idle time, duration of the day, day of the week, special events, distance, location, timings, price, car wash available time, vehicle condition, weather, climate, and terrain. The at least one preferred value can, in some implementations, be based on a second weight value. The second weight value can be automatically determined based on a default configuration stored in the memory of the origination terminal, or based on preferences established by the user interface on the origination terminal and stored in the memory of the origination terminal. In some implementations, the second weight value can be manually or automatically set by the user via the remote server. However, additional parameters may also be used to determine the plurality of offers. These operations can be performed at the origination terminal, but can also be performed on a remote server, which is described in detail below.

At 120, the image or video data can be processed by the remote server. To process the image or video data, the remote server can use an image processing algorithm to estimate a current idle time associated with the origination terminal. The current idle time can, in some implementations, be a measure of time that an individual car wash bay is unoccupied.

At 130, one or more aspects of the plurality of offers of the first data packet can be controlled by the remote server based on the current idle time. In some implementations, the remote server can modify the content of the plurality of offers.

At 140, a second data packet can be transmitted to the end user terminal via the remote server. The second data packet can be created by the remote server, and it can comprise the content of the first data packet with no changes made. In some implementations, the remote server can control and/or modify one or more aspects of the plurality of offers of the first data packet and create the second data packet to include the modified plurality of offers. In some implementations, the end user terminal can be an infotainment user interface in an automobile that is configured to display information contained in the first data packet and to receive inputs from the user based on the displayed information. In other implementations, the end user terminal can be an application on a smartphone of a user that is also configured to display information contained in the first data packet and to receive inputs from the user based on the displayed information. In some implementations, the receipt and transmittal of the first data packet to/from the remote server can occur via an internet connection, Bluetooth, Wifi, or a LAN. In other implementations, the remote server can include a gas dispenser management system, and the end user terminal can comprise an interface on a gas dispenser configured to display information contained in the first data packet and to receive inputs from the user based on the displayed information.

A user can then select a preferred offer from the plurality of offers in the second data packet using the end user terminal. The preferred offer can, in some implementations, be determined in response to a preferred value for at least one of the following parameters: distance, location, timings, price, car wash available time, vehicle condition, weather and climate, and terrain. Other parameters with preferred values by which the preferred offer can be determined are possible, such as, by way of non-limiting example, car wash profit margins, whether a prospective car wash user is a first-time user, the purchase history of the user, the type of automobile associated with the end user terminal, the date/time, and the weather.

At 150, the remote server can receive the selection of the preferred offer from the end user terminal. At 160, the preferred offer can be provided to the origination terminal via the remote server. The origination terminal can, in some implementations, instruct the individual car wash bays to perform the at least one car wash service based on the preferred offer. In other implementations, the origination terminal can generate a coupon that is matched to the user based on the preferred offer and redeemable by the user at a point-of-sale interface. The point-of-sale interface can be operatively coupled to the individual car wash bays and configured to operate the individual car wash bays such that the at least one car wash service based on the preferred offer is performed.

In some implementations, the plurality of offers can include at least one appointment time during which the user may utilize the individual car wash bays to receive the at least one car wash service. In such an implementation, as part of determining the preferred offer, the user can select a desired appointment time from the at least one appointment time to receive the at least one car service, which can be provided to the computerized car wash availability management system. The computerized car wash availability management system can update a record of availability of individual car wash bays based on the receipt of desired appointment time.

Figure 2:
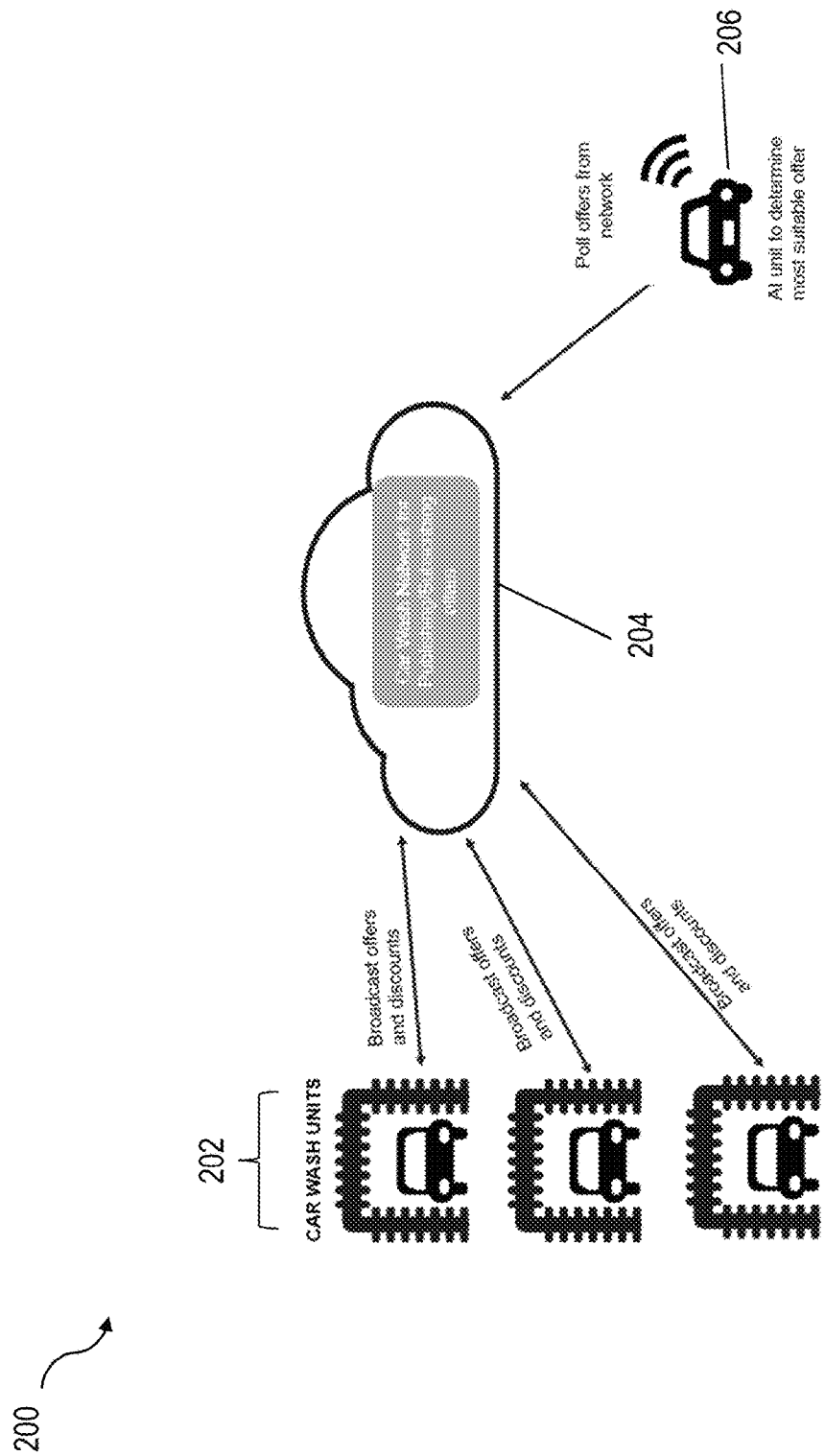
FIG. 2 is a schematic view illustrating components of an example system for the optimized utilization and promotion of car wash services.

FIG. 2 is a schematic view illustrating components of an example system 200 for the optimized utilization and promotion of car wash services. As shown, the system 200 can include at least one car wash unit 202 that is in operable configuration with a car wash network 204. The car wash network 204, which can be a cloud-based network, can be configured to publish offers and/or discounts on car wash services to be performed by the at least one car wash unit 202. The system 200 can also include an end user interface 206 that is in operable communication with the car wash network and configured to receive the offers and/or discounts and automatically determine, from the offers and/or discounts, which of the offers and/or discounts is most suitable.

Figure 3:
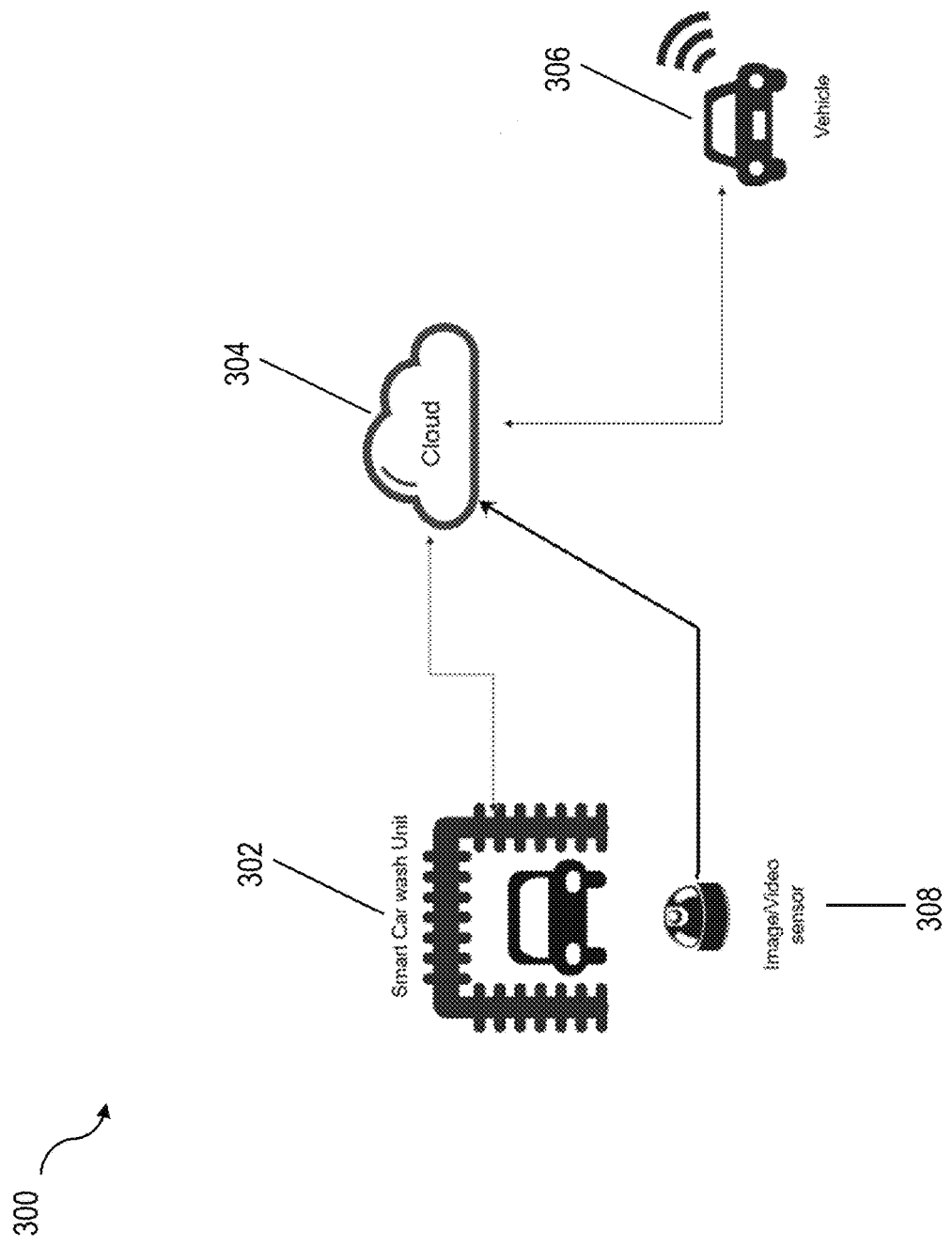
FIG. 3 is a schematic view illustrating components of an example system for the optimized utilization and promotion of car wash services including a sensor for detecting the presence of a vehicle in a car wash bay.

The end user interface 206 can also include an input configured to permit the user to select a preferred offer for transmission to the car wash network 204. The preferred offer can be transmitted to the at least one car wash unit 202, which can perform at least one car wash service FIG. 3 is a schematic view illustrating components of an example system 300 for the optimized utilization and promotion of car wash services. System 300 includes at least one car wash unit 302, a car wash network 304, and end user interface 306, which are substantially the same as the at least one car wash unit 302, the car wash network 304, and the end user interface 306, but further includes an image/video sensor 308 capable of acquiring image or video data of the environs of the at least one car wash unit 302. In some implementations, the image/video sensor 308 can acquire image or video data of the at least one car wash unit 302 and the area surrounding the at least one car wash unit 302. The acquired image or video data can be processed by the car wash network 304, using image processing algorithms known in the art, for example, to determine the presence of a vehicle in the at least one car wash unit 302 and to transmit a signal indicating the presence of the vehicle in the at least one car wash unit 302 to the car wash network 304. Such processing can occur on a continuous basis or a discrete basis as needed. In some implementations, the processing can be performed by the at least one car wash unit 302 instead of, or in addition to, the car wash network 304.

Furthermore, upon processing the image or video data of the at least one car wash unit 302, the car wash network 304 can analyze the processed data to determine various information items including, for example, the number of vehicles in line for the at least one car wash unit 302, the approximate time each vehicle spends in a car wash bay, and so on. The car wash network 304 can utilize this information to calculate an estimated idle time, i.e., an estimated time a hypothetical vehicle would wait in line for a car wash, in conjunction with other factors in some cases (e.g., current and historical individual car wash bay usage data), as described in detail hereinabove. The car wash network 304 can provide the estimated idle time to the end user interface 306 to inform the user of the same. Furthermore, the car wash network 304 can control or modify the offers and/or discounts to the end user interface 306 based on the estimated idle time. For example, the car wash network 304 can issue greater discounts at times when the idle time is low (e.g., below a predefined threshold) to encourage users to visit while the car wash is not busy, thereby optimizing the utilization of the car wash.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method comprising:
   receiving, at a remote server operatively coupled to an origination terminal and an end user terminal, a first data packet, the first data packet having a plurality of offers and image or video data acquired by an image/video sensor, the first data packet received from the origination terminal;
   processing, by the remote server, the image or video data using an image processing algorithm to estimate a length of time of idleness associated with the origination terminal;
   comparing, by the remote server, the estimated length of time of idleness to a predetermined threshold length of time of idleness;
   controlling, by the remote server, one or more aspects of the plurality of offers based on a result of the comparison;
   transmitting, by the remote server, a second data packet including the plurality of offers to the end user terminal;
   receiving, at the remote server, a selection of a preferred offer of the plurality of offers from the end user terminal; and
   providing, via the remote server, the preferred offer to the origination terminal.

2. The method of claim 1, wherein the plurality of offers includes at least one price for at least one car wash service.

3. The method of claim 1, wherein the first data packet further includes at least one appointment time.

4. The method of claim 3, further comprising:
   receiving, at the remote server, an indication of a preferred appointment time from the end user terminal; and
   providing, via the remote server, the preferred appointment time to the origination terminal.

5. The method of claim 1, wherein the preferred offer is determined in response to a preferred value for at least one of the following parameters: the length of time of idleness, a duration of the day, a day of the week, special events, a distance, a location, timing, a price, a car wash available time, a vehicle condition, weather, climate, and terrain.

6. The method of claim 5, wherein the preferred value is established by the end user terminal.

7. The method of claim 5, wherein the preferred value is established by the remote server.

8. The method of claim 1, wherein the receiving of the first data packet, the processing, the comparing, the controlling, the transmitting, the receiving of the selection, and the providing is performed by at least one data processor forming part of at least one computing system.

9. A system comprising:
   at least one data processor; and
   memory storing instructions configured to cause the at least one data processor to perform operations comprising:
      receiving, at a remote server operatively coupled to an origination terminal and an end user terminal, a first data packet, the first data packet having a plurality of offers and image or video data acquired by an image/video sensor, the first data packet received from the origination terminal;
      processing, by the remote server, the image or video data using an image processing algorithm to estimate a length of time of idleness associated with the origination terminal;

comparing by the remote server, the estimated lenqh of time of idleness to a predetermined threshold length of time of idleness;

controlling, by the remote server, one or more aspects of the plurality of offers based on a result of the comparison;

transmitting, by the remote server, a second data packet including the plurality of offers to the end user terminal;

receiving, at the remote server, a selection of a preferred offer of the plurality of offers from the end user terminal; and providing, via the remote server, the preferred offer to the origination terminal.

10. The system of claim 9, wherein the plurality of offers includes at least one price for at least one car wash service.

11. The system of claim 9, wherein the first data packet further includes at least one appointment time.

12. The system of claim 11, wherein the operations further comprise:

receiving, at the remote server, an indication of a preferred appointment time from the end user terminal; and providing, via the remote server, the preferred appointment time to the origination terminal.

13. The system of claim 9, wherein the preferred offer is determined in response to a preferred value for at least one of the following parameters: the length of time of idleness, duration of the day, a day of the week, special events, a distance, a location, timing, a price, a car wash available time, a vehicle condition, weather, climate, and terrain.

14. The system of claim 13, wherein the preferred value is established by the end user terminal.

15. The system of claim 9, wherein the receiving of the first data packet, the processing, the comparing, the controlling, the transmitting, the receiving of the selection, and the providing is performed by at least one data processor forming part of at least one computing system.

16. A non-transitory computer program product storing instructions which, when executed by at least one data processor forming part of at least one computing system, cause the at least one data processor to implement operations comprising:

receiving, at a remote server operatively coupled to an origination terminal and an end user terminal, a first data packet, the first data packet having a plurality of offers, and image or video data acquired by an image/video sensor, the first data packet received from the origination terminal;

processing, by the remote server, the image or video data using an image processing algorithm to estimate a length of time of idleness associated with the origination terminal;

comparing, by the remote server, the estimated length of time of idleness to a predetermined threshold length of time of idleness;

controlling, by the remote server, one or more aspects of the plurality of offers based on a result of the comparison;

transmitting, by the remote server, a second data packet including the plurality of offers to the end user terminal;

receiving, at the remote server, a selection of a preferred offer of the plurality of offers from the end user terminal; and providing, via the remote server, the preferred offer to the origination terminal.

17. The method of claim 1, wherein the length of time of idleness characterizes a length of time during which a vehicle bay of a car wash is unoccupied by a vehicle, and wherein the controlling includes lowering a price of a car wash service characterized by the plurality of offers, the lowering based on the result of the comparison.

18. The method of claim 1, wherein the length of time of idleness characterizes a length of time during which a user of a car wash must wait to use a car wash, and wherein the controlling includes increasing a discount of a price of a car wash service characterized by the plurality of offers when the comparison indicates the estimate length of time of idleness is less than the predetermined threshold length of time of idleness.

19. The method of claim 1, wherein the processing includes evaluating an algorithm to estimate the length of time of idleness, and wherein the algorithm is configured to estimate the length of time of idleness based on historical data characterizing use of a car wash bay.

20. The method of claim 19, wherein the algorithm is configured to estimate the length of time of idleness based on a prediction of future availability of the car wash bay.

* * * * *